US012697677B2

(12) United States Patent　(10) Patent No.: US 12,697,677 B2
Linde et al.　(45) Date of Patent: Aug. 4, 2026

(54) FRICTION STIR WELDING METHOD AND DEVICE, AS WELL AS WORKPIECE COMPRISING A BUTT WELD SEAM

(71) Applicants: Airbus Operations GmbH, Hamburg (DE); AIRBUS (S.A.S.), Blagnac (FR)

(72) Inventors: Peter Linde, Hamburg (DE); Blanka Lenczowski, Hamburg (DE)

(73) Assignees: Airbus Operations GmbH, Hamburg (DE); Airbus (S.A.S.), Blagnac (FR)

( * ) Notice: Subject to any disclaimer, the term of this patent is extended or adjusted under 35 U.S.C. 154(b) by 0 days.

(21) Appl. No.: 18/420,517

(22) Filed: Jan. 23, 2024

(65) Prior Publication Data

US 2024/0326154 A1　Oct. 3, 2024

(30) Foreign Application Priority Data

Mar. 31, 2023　(EP) ..................................... 23166078

(51) Int. Cl.
　B23K 20/12　(2006.01)
　B23K 11/00　(2006.01)
　B23K 101/00　(2006.01)
(52) U.S. Cl.
　CPC ...... B23K 20/1255 (2013.01); B23K 11/0073 (2013.01); *B23K 2101/006* (2018.08)
(58) Field of Classification Search
　None
　See application file for complete search history.

(56) References Cited

U.S. PATENT DOCUMENTS

| | | | | |
|---|---|---|---|---|
| 6,722,556 B2 * | 4/2004 | Schilling | ............ | B23K 20/1265 |
| | | | | 228/2.1 |
| 6,726,085 B2 * | 4/2004 | Litwinski | ........... | B23K 20/1275 |
| | | | | 228/199 |
| 7,494,092 B2 * | 2/2009 | Brenner | .................... | B64C 1/12 |
| | | | | 244/119 |

(Continued)

FOREIGN PATENT DOCUMENTS

| | | | | | |
|---|---|---|---|---|---|
| CN | 111531268 A | * | 8/2020 | ............. | B23K 20/26 |
| CN | 113441831 B | * | 8/2022 | ............. | B23K 20/12 |

(Continued)

OTHER PUBLICATIONS

Extended European Search Report for EP Application No. 23166078.8 dated Sep. 21, 2023, 7 pages.

(Continued)

*Primary Examiner* — Devang R Patel
(74) *Attorney, Agent, or Firm* — Nixon & Vanderhye P.C.

(57) ABSTRACT

A method for friction stir welding along a butt joint weld line (40). A welding device (70) includes a probe assembly (90) including at least a first and second probe device (100*a*, 100*b*). A first and second part (31*a*, 31*b*) to be joined along the weld line (40) are provided, wherein the parts are each formed as a laminate (1; 1') including at least a first layer (2*a*, 2*b*) formed with a first material and a second layer (5*a*, 5*b*) formed with a second material. The first and second materials have different material properties. The method friction stir welds of the parts using the welding device, wherein simultaneously the first probe device acts on the first layers and the second probe device acts on the second layers.

10 Claims, 3 Drawing Sheets

(56) References Cited

U.S. PATENT DOCUMENTS

| | | | | |
|---|---|---|---|---|
| 7,507,309 | B2 * | 3/2009 | Manicke | B23K 20/122 |
| | | | | 228/112.1 |
| 7,628,876 | B2 * | 12/2009 | Chen | B32B 7/12 |
| | | | | 156/290 |
| 7,641,096 | B2 * | 1/2010 | Burton | B23K 20/125 |
| | | | | 228/2.1 |
| 7,875,333 | B2 * | 1/2011 | Stephan | B29C 70/86 |
| | | | | 428/189 |
| 7,879,421 | B2 * | 2/2011 | Manicke | B29C 66/3034 |
| | | | | 428/297.4 |
| 8,444,090 | B2 * | 5/2013 | Reye | B64C 1/069 |
| | | | | 244/119 |
| 8,678,267 | B2 * | 3/2014 | Heck | B32B 15/043 |
| | | | | 228/2.1 |
| 9,999,940 | B2 * | 6/2018 | Mialhe | B23K 20/122 |
| 10,456,985 | B2 | 10/2019 | Silvanus et al. | |
| 10,829,193 | B2 | 11/2020 | Pacchione et al. | |
| 11,766,738 | B2 * | 9/2023 | Martin | B23K 20/1225 |
| | | | | 228/112.1 |
| 2007/0187469 | A1 * | 8/2007 | Chen | B32B 7/12 |
| | | | | 228/112.1 |
| 2010/0092789 | A1 * | 4/2010 | Heck | B32B 5/26 |
| | | | | 228/114.5 |
| 2011/0094613 | A1 | 4/2011 | Rosen | |
| 2016/0167161 | A1 * | 6/2016 | Sato | B23K 20/122 |
| | | | | 228/114.5 |

FOREIGN PATENT DOCUMENTS

| | | |
|---|---|---|
| DE | 10 2011 006 032 A1 | 9/2012 |
| EP | 3088163 A1 | 11/2016 |
| JP | 2002263863 A | 9/2002 |
| WO | 2012/127038 A2 | 9/2012 |

OTHER PUBLICATIONS

EP applicaiton 23 166 078.8, EPO Office Action, Jan. 8, 2026 (4 pages).

* cited by examiner

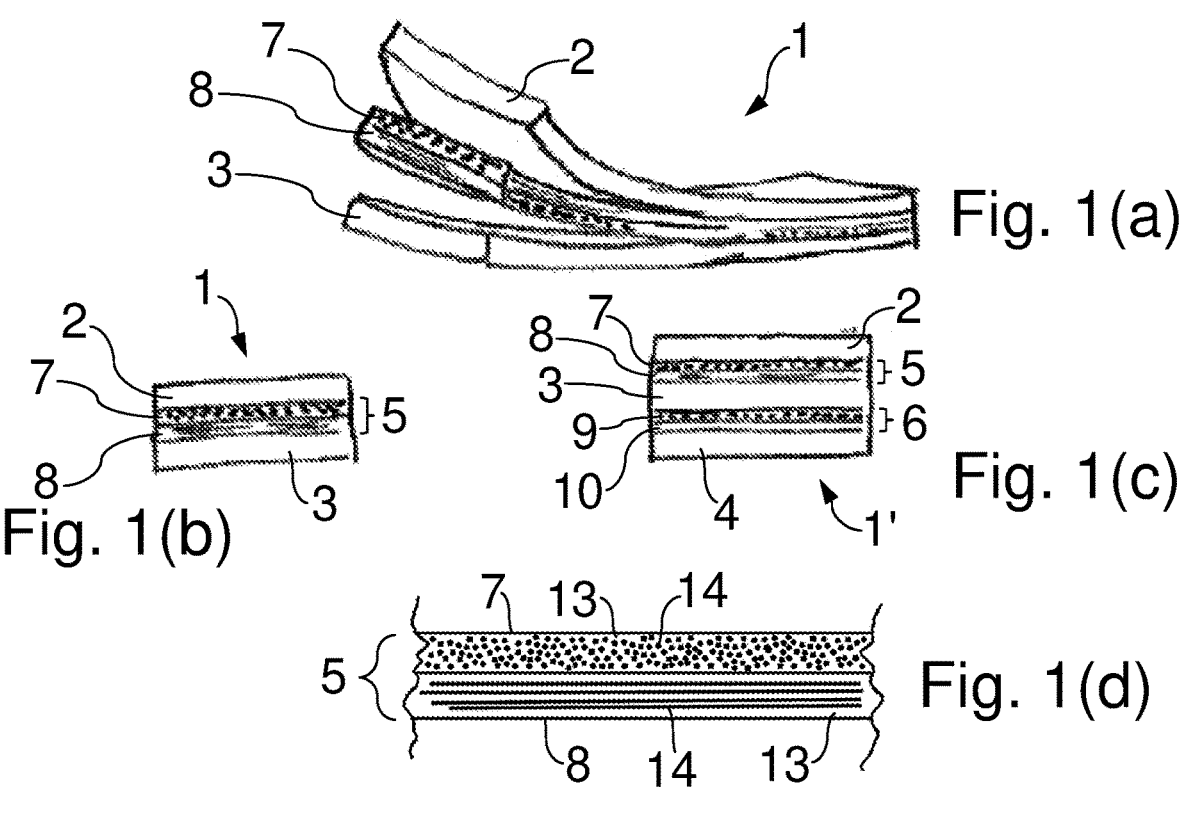
Fig. 1(a)
Fig. 1(b)
Fig. 1(c)
Fig. 1(d)
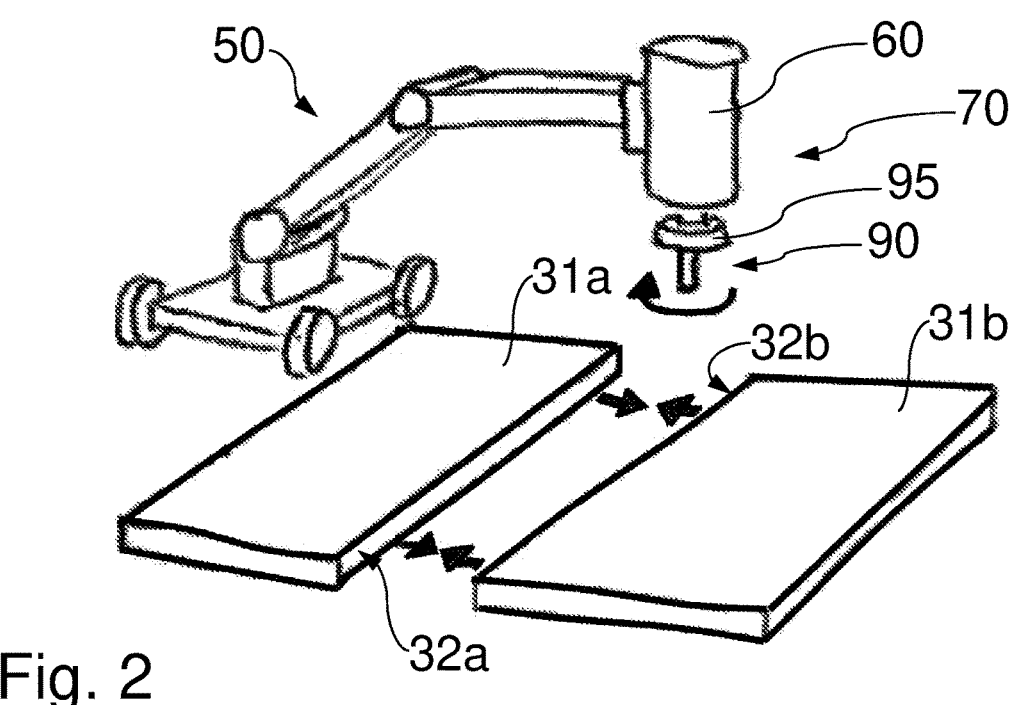
Fig. 2

FRICTION STIR WELDING METHOD AND DEVICE, AS WELL AS WORKPIECE COMPRISING A BUTT WELD SEAM

RELATED APPLICATION

This application incorporates by reference and claims priority to European patent application EP 23166078.8, filed Mar. 31, 2023.

TECHNICAL FIELD

The present invention is directed to the field of friction stir welding, and more specifically to a method for friction stir welding and to a friction stir welding device. Further, the invention is directed to a workpiece comprising a butt weld seam along which two parts or sections of the workpiece are joined.

TECHNICAL BACKGROUND

Fiber metal laminates formed as hybrid composite materials, comprising alternating layers of metallic and plastic materials, such as polymers, have already been described. Such materials can be advantageous in that they have less weight and a better fatigue behavior than a single sheet solid metal. Exemplary fiber metal laminates comprise aluminum alloy layers and aramid fiber-reinforced or glass-fiber reinforced polymer layers.

Fiber metal laminates are resilient and reliable materials suitable for aeronautical use. For example, a material known as GLARE is used in the manufacturing of air-craft, e.g. as a fuselage material in the Airbus A380 with high strength performance, increased damage tolerance and considerable weight savings. GLARE comprises layers of an aluminum alloy as well as interposed layers of glass fiber-reinforced epoxy resin.

Two parts or sections of such a fiber metal laminate, e.g. in the form of panels, can be joined by means of fastening elements, such as rivets or bolts, and using a lap joint, in order to form a workpiece or larger assembly. Forming such joints is relatively labor-intensive. From the point of view of weight reduction, it may be desired to avoid the material overlap needed for the lap joint.

Friction stir welding per se is known. Using friction stir welding, it is possible to join two monolithic sheets at a butt joint. The material of the sheets is heated up using frictional heat generated by a rotating probe acting on the sheets at the location of the joint. The sheets are placed so that edges thereof to be joined are adjacent to each other. The rotating probe is lowered into the material at the joint until it reaches substantially the full depth thereof, and is moved along the location of the intended joint. The amount of heat introduced is adapted so that the material plasticizes, but does not melt. When the probe moves away from a section of the joint, the plasticized material of both sheets has become mixed, and as the temperature drops, the plastic state quickly solidifies. In this manner, a butt joint weld line is formed. Pioneering work on friction stir welding has been done by The Welding Institute (TWI) in the United Kingdom.

A fiber metal laminate comprising metal layers made from an AlMg alloy or AlMgSc alloy and layers of a thermoplastic synthetic material with embedded reinforcing fibers, for example glass fibers, carbon fibers or Zylon® fibers, has been described in DE 10 2011 006 032 A1 and WO 2012/127038A2.

A method of friction stir welding of component parts containing thermoplastic as well as metal layers is described in U.S. Pat. No. 10,456,985 B2. The described method uses a single probe throughout the whole thickness of the laminates to be joined.

SUMMARY

In view of this background, a problem to be solved by the present invention is to provide a method and device for joining two parts formed of a laminate by a butt weld seam in an improved manner. Further, a correspondingly improved workpiece is to be provided.

An embodiment of the invention is a method for friction stir welding along a butt joint weld line, wherein the method comprises steps of:

provide a welding device which comprises a probe assembly including at least a first probe device and a second probe device;

providing a first part and a second part to be joined along the butt joint weld line, wherein the parts are each formed as a laminate comprising at least a first layer formed with a first material and a second layer formed with a second material, the first and second materials having different material properties;

arranging the parts such that an edge of the first part is adjacent to an edge of the second part; and performing friction stir welding of the parts using the welding device, including rotating the probe devices and moving the welding device along the adjacent edges in such a manner that simultaneously, the first probe device acts on the first layers and the second probe device acts on the second layers.

Furthermore, the invention may be embodied in a friction stir welding device for joining two parts along a butt joint weld line, wherein the parts to be joined are each formed as a laminate comprising at least a first layer and a second layer having different material properties. The welding device comprises a probe assembly including at least a first probe device and a second probe device. The first probe device is adapted to friction stir welding of the first layers of the parts. The second probe device is adapted to friction stir welding of the second layers of the parts.

Still further, a workpiece is provided which comprises a butt weld seam along which two parts or sections of the workpiece, each made from a fiber metal laminate including at least one metal layer and at least one synthetic layer with embedded reinforcing fibers, are joined. Corresponding layers of the parts or sections of the workpiece are individually welded along the butt weld seam. The workpiece may in particular be formed as a component of an aircraft or spacecraft.

In the workpiece, the parts or sections of the workpiece may in particular be joined along the butt weld seam using the friction stir welding device and methods disclosed here.

Further, the friction stir welding device may in particular be used in the method for friction stir welding.

The invention may be applied to friction stir weld laminated materials, such as fiber metal laminates (FMLs), comprising layers of different materials such as metal layers and thermoplastic layers, e. g. in alternating arrangement, and at the same time to take into account specific differences in the behavior of such different materials during the friction stir welding process. This is accomplished in an efficient manner using the probe assembly which includes at least two probe devices. In particular, the invention may be applied to form butt weld seams of high quality in laminated materials such as FMLs.

Advantageous developments and improvements of the invention are disclosed in the description and the drawings.

In a development of the method, the material of the first layer and the material of the second layer at least have different thermal conductivity. In a development of the friction stir welding device, the parts, which the friction stir welding device is adapted to join by friction stir welding, are configured such that a material of the first layer and a material of the second layer at least have different thermal conductivity. Accordingly, the thermal behavior of the different materials can be taken into account when friction stir welding each layer, the action of the probe devices on the different layers can be adapted accordingly, and thus, the individual layers can be welded in an optimized manner.

In a development of the method, the first layer is a metal layer and the second layer is a synthetic layer, in particular a synthetic layer comprising a thermoplastic material. In a development of the friction stir welding device, the parts, which the friction stir welding device is adapted to join by friction stir welding, are configured such that the first layer is a metal layer and the second layer is a synthetic layer, in particular a synthetic layer comprising a thermoplastic. For example, the metal layer may be formed with an aluminum alloy. Such a method and device make it possible to friction stir weld laminates which have reduced weight and improved fatigue behavior, for example, in an improved, efficient and time-saving manner.

In a development of the method, the parts to be joined are each made from a fiber-metal laminate, wherein the first layer is a metal layer and the second layer is a synthetic layer formed with a thermoplastic matrix and reinforcing fibers embedded therein. In a development of the friction stir welding device, the parts, which the friction stir welding device is adapted to join by friction stir welding, are each made from a fiber-metal laminate, wherein the first layer is a metal layer and the second layer is a synthetic layer formed with a thermoplastic matrix and reinforcing fibers embedded therein. In this way, lightweight, resilient and reliable FMLs can be joined in an optimized manner.

In a development of the method, a thickness of each of the layers may be less than or equal to 1.0 mm. According to a development of the friction stir welding device, in the parts, which the friction stir welding device is adapted to join by friction stir welding, a thickness of each of the layers may be less than or equal to 1.0 mm. For example, parts having such layer thicknesses may in some embodiments be useful in particular for forming wall-type or shell-type workpieces or sections thereof.

In a development of the method, the probe assembly is being moved as a unit along the butt joint weld line during the friction stir welding of the parts. According to a development of the friction stir welding device, the probe assembly is movable as a unit along the butt joint weld line during friction stir welding of the parts. In this manner, a butt weld seam can be formed in an efficient, rapid manner.

In a development of the method and of the friction stir welding device, the probe devices are coaxially arranged. Such an arrangement contributes to a compact and relatively simple configuration of the probe assembly.

According to a development of the method, each of the probe devices comprises a rotatable probe body in contact with corresponding ones of the layers to be joined during the friction stir welding. In a development of the friction stir welding device, each of the probe devices comprises a rotatable probe body. In particular, an axial length of each of the probe bodies may be adapted to a thickness of the corresponding layers to be joined by friction stir welding using the probe body. In this way, corresponding ones of the layers of the laminate can be welded in a precise and targeted manner.

Each of the probe devices may comprise a shaft connected with the probe body for co-rotation, in particular such that the probe body and the shaft are coaxially arranged. Further, in this development, the probe body and the shaft of at least one of the probe devices comprise an axially extending passage and the shaft of another one of the probe devices is insertable into and optionally through the passage so as to be rotatably received in the passage. In this way, the probe bodies can be rotatably supported in a simple and compact manner. Further, an axial arrangement of the probe bodies in a manner corresponding to a sequence of layers of the laminate can be facilitated.

In a development of the method, outer diameters of the probe bodies of the first and second probe devices are different from each other and/or the probe body of the first probe device rotates at a rotational velocity that is different from a rotational velocity of the probe body of the second probe device. In this way, using the different outer diameters, a width of a friction stir butt weld seam can be adapted to and optimized for the type of material of each pair of corresponding first or second layers, depending on the material properties of the material of which these layers are made, e.g. on thermal conductivity. Moreover, a rotational velocity of each probe body can in this way be adapted to the friction required to generate a sufficient amount of heat for welding layers of a specific material, and can also be adapted to the selected outer diameter of the respective probe body.

According to a development of the friction stir welding device, the probe body of the first probe device is formed with a first outer diameter, the probe body of the second probe device is formed with a second outer diameter, and the first and second outer diameters are different from each other.

In particular, the first outer diameter, which is the outer diameter of the probe body of the first probe device, is larger than the second outer diameter, which is the outer diameter of the probe body of the second probe device. This may be advantageous in particular if the first layers exhibit a higher thermal conductivity than the second layers, for example if the first layers are metal layers and the second layers are synthetic layers, e.g. comprising a thermoplastic.

In accordance with a development, the welding device further comprises a drive arrangement capable of driving the probe bodies of the probe devices for rotation thereof, wherein the drive arrangement is configured to simultaneously drive the probe bodies of the first and second probe devices in such a way that the probe body of the first probe device rotates at a rotational velocity that is different from, in particular lower than, a rotational velocity of the probe body of the second probe device. Advantages of such different rotational velocities have been outlined above. In some embodiments, the rotational velocities of the probe devices may be individually adjustable.

In a further development, each of the probe devices is provided with a sprocket or gear or other engagement geometry for coupling the probe device to the drive arrangement. In particular, the sprocket or gear or other engagement geometry is arranged on the shaft of the probe device. In this way, the probe devices can be conveniently coupled to the drive arrangement for being rotationally driven. Further, for example, a transmission ratio may in some embodiments be implemented using such sprocket or gear transmissions.

In a development of the method and the welding device, the welding device may comprise three or more probe devices for friction stir welding of laminates having three or more layers. In this way, laminates having more than two layers can be conveniently welded. The parts or workpiece sections may be each formed from a laminate comprising three layers, in particular two metal layers and a synthetic layer interposed therebetween, or five layers, in particular three metal layers and two synthetic layers that are alternatingly arranged.

In particular, the workpiece may according to a development be formed as a vessel of a storage tank for liquefied gas, in particular for cryogenic hydrogen. In this way, a lightweight, efficient and safe storage tank can be formed, for example for use in an aircraft provided with hydrogen-based propulsion.

In particular, in a development of the workpiece, the at least one metal layer is formed with an aluminum alloy and the at least one synthetic layer is formed with a thermoplastic matrix in which the reinforcing fibers are embedded.

Furthermore, the further developments described above with respect to the method or the welding device of the invention may be applied in analogous manner to the workpiece of the invention.

The improvements, developments and enhancements of the invention may be arbitrarily combined with each other whenever this makes sense. Moreover, other possible enhancements, developments and implementations of the invention comprise combinations of features of the invention which have been described above or will be described in the following in relation to the detailed description of embodiments, even where such a combination has not been expressly mentioned.

SUMMARY OF THE DRAWINGS

The present invention is explained in more detail below with reference to the embodiments shown in the schematic figures, wherein:

FIGS. 1(*a*) and 1(*b*) show a configuration of an exemplary fiber metal laminate comprising two metal layers and an interposed synthetic layer;

FIG. 1(*c*) shows a configuration of another exemplary fiber metal laminate comprising three metal layers and two interposed synthetic layers;

FIG. 1(*d*) shows a synthetic layer in a more detailed cross-sectional view;

FIG. 2 shows a schematic perspective overview of friction stir welding of two sheet-type parts of material according to an embodiment;

Figure 3:
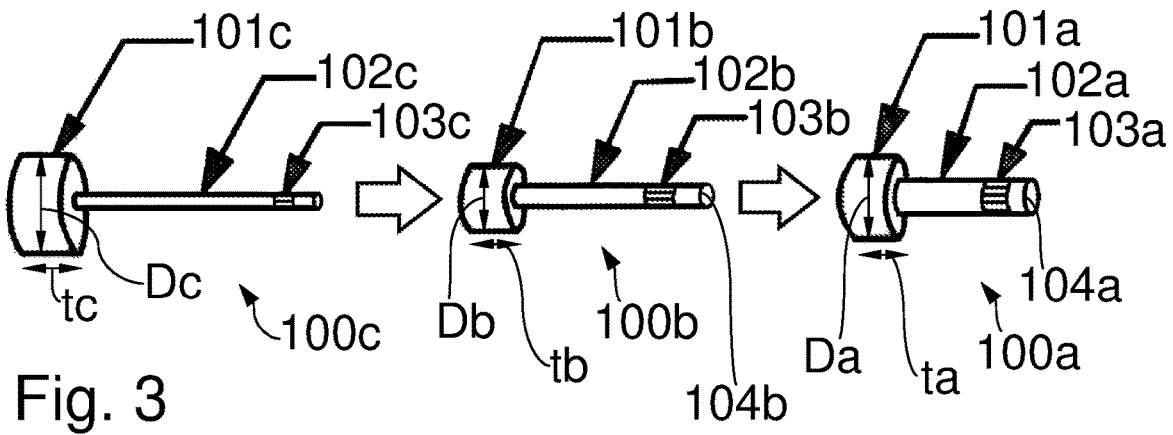
FIG. 3 displays three probe devices, configured to be assembled in order to form a probe assembly, in accordance with an embodiment of the invention.

In the figures of the drawing, elements, features and components which are identical, functionally identical and of identical action are denoted in each case by the same reference designations unless stated otherwise. Elements of the drawings are not necessarily drawn to scale.

DESCRIPTION OF EXEMPLARY EMBODIMENTS

FIG. 1 (*a*) and FIG. 1 (*b*) show a fiber metal laminate 1, configured as a hybrid layered material with two metal layers 2, 3 and an interposed synthetic layer 5 between the metal layers 2, 3. The metal layers 2, 3 are each formed from an aluminum alloy. The synthetic layer 5 comprises, in the exemplary laminate 1 of FIGS. 1(*a*) and 1(*b*), two synthetic sublayers 7 and 8.

In FIG. 1 (*c*), another exemplary fiber metal laminate 1' is illustrated, which comprises three metal layers 2, 3 and 4 with two interposed synthetic layers 5 and 6. The metal layers 2, 3, 4 and the synthetic layers 5, 6 of the laminate 1' are alternatingly arranged one upon another. The metal layers 2, 3, 4 of the laminate 1' are each formed from an aluminum alloy. In FIG. 1 (*c*), the synthetic layer 5 comprises two synthetic sublayers 7 and 8, and the synthetic layer 6 comprises two synthetic sublayers 9 and 10.

The aluminum alloy from which the layers 2, 3 or 2, 3 and 4 are formed may, for example, be an aluminum-magnesium-scandium alloy or AlMgSc alloy. Such AlMgSc alloys have optimal material properties at temperatures up to approximately 400° C. and can be advantageous in terms of performance, e.g. with regard to the fatigue behavior, of workpieces formed from the laminate 1 or 1'.

Each of the synthetic layers 5 and 6 is formed with a matrix 13 of a thermoplastic material, in particular a high performance thermoplastic, which for example may be any of a polyphenylene sulfide or PPS, a polyimide or PI, a polyaryletherketone or PAEK. For example, the thermoplastic material used to form the matrix 13 may be a polyetherketone or PEK or a polyetheretherketone or PEEK or a polyetherketoneketone or PEKK. These thermoplastics are weldable and re-weldable.

The sublayer 7 and 8 of the synthetic layer 5 shown in FIG. 1 at (a) and (b) may be formed as thickness regions of an integral layer 5. In each sublayer 7, 8, reinforcing fibers 14 are embedded in the matrix 13. More specifically, in the first thickness region or sublayer 7, the fibers 14 extend substantially perpendicular to the plane of projection of FIG. 1 (*b*) and (*d*), while in the second thickness region or sublayer 8, the fibers 14 extend substantially parallel to that plane of projection. The exemplary configuration of the sublayers 7, 8 is shown in more detail in FIG. 1 (*d*). The sublayers 9, 10 of the synthetic layer 6 may be configured in the same manner. However, the fibers 14 may in other examples be arranged different from the exemplary configuration displayed in FIG. 1, in accordance with the mechanical properties of the laminate 1 or 1' that are desired, and accordingly, more or fewer sublayers may in variants be provided for the synthetic layer(s) 5 and/or 6.

FIGS. 1(*a*) and (*b*) show two metal layers 2, 3 and a single synthetic layer 5. FIG. 1(*c*) shows three metal layers 2, 3, 4 and two synthetic layers 5, 6. Different numbers of metal and/or synthetic layers are within the scope of the invention. Fiber metal laminates such as laminates 1 or 1' have less weight than comparable solid metal sheets, for example, and also display a better fatigue behavior than such solid sheets.

FIG. 2 schematically shows an arrangement for friction stir welding of two sheet-type sections or parts 31a and 31b of a workpiece, which in FIG. 2 are configured as two separate pieces that are joined by the friction stir welding process. Each part 31a and 31b is configured as a laminate formed with at least one first layer which is formed as a metal layer, and at least one second layer which is formed as a synthetic layer. In exemplary manner, each of the parts 31a, 31b may be formed from the fiber metal laminate 1 or 1' described herein above, or may be formed from a variant of laminates 1, 1' having a different number of metal and/or synthetic layers and/or a different arrangement of synthetic sublayers.

Accordingly, in exemplary manner, the first layer is formed with a first material, which is a metal such as an aluminum alloy, and the second layer is formed with a second material, which is a thermoplastic synthetic matrix 13 with embedded reinforcing fibers 14. The first layer may correspond to the metal layer 2, and the second layer may correspond to the synthetic layer 5. The parts 31a, 31b in accordance with embodiments described in the following further include a third layer corresponding to the metal layer 3, and may in variants additionally include a fourth layer corresponding to synthetic layer 6 and fifth layer corresponding to metal layer 4.

In the following, a method of friction stir welding and a welding device 70 will be described in exemplary manner and more detail with reference to the laminate 1.

The arrangement of FIG. 2 includes a friction stir welding device 70 adapted to join the two parts 31a, 31b along a butt joint weld line. The friction stir welding device 70 comprises a probe assembly 90 and a drive arrangement 60 for rotationally driving the probe assembly 90. A shoulder 95, also displayed in FIG. 2, may optionally be provided, as part of the device 70, or may be omitted. In the arrangement of FIG. 2, the friction stir welding device 70 is mounted on a robotic device 50.

In order to form a butt weld seam, the sheet-type parts 31a and 31b are arranged such that an edge 32a of part 31a faces an edge 32b of part 31b. The parts 31a, 31b are moved towards each other such that the edges 32a, 32b are substantially parallel and adjacent to each other, and in particular such that the parts 31a, 31b abut against each other along the adjacent edges 32a, 32b.

The relative positions of the parts 31a, 31b may then be fixed by one or more devices, e.g. jig(s), not shown in the Figures. Then, friction stir welding of the two pieces 31a, 31b is performed using the welding device 70, which is moved along the adjacent edges 32a, 32b by the robotic device 50.

The materials of the metal layers 2, 3, 4 and of the synthetic layers 5, 6 have material properties different from each other. In particular, the thermal conductivities of the layers 2, 3 or 2, 3 and 4 are different from those of the layers 5, 6. The friction stir welding device 70 is configured to perform friction stir welding for joining the parts 31a, 31b simultaneously through the entire thickness of the laminate, e.g. 1 or 1', from which the parts 31a, 31b are formed, in a manner which joins corresponding ones of the layers, e.g. 2, 5, 3 or 2, 5, 3, 6, 4, individually along the butt weld seam that is formed. More specifically, in this way, corresponding layers formed from the same material can be individually joined across the weld line. Using the welding device 70, this is accomplished while at the same time, the different material properties of these layers are taken into account.

The configuration of the welding device 70 will now be described with reference to an exemplary embodiment, illustrated in FIGS. 3 and 4, in which the optional shoulder 95 is omitted.

The welding device 70 comprises the probe assembly 90, which includes in this embodiment a first probe device 100a, a second probe device 100b and a third probe device 100c.

The first probe device 100a comprises a probe body 101a and a central shaft 102a. The shaft 102a extends from one end face of the probe body 101a. The probe body 101a has a substantially circular outer cross-section, may be substantially cylindrical, and has an outer diameter Da as well as an axial length ta. Further, the shaft 102a may be substantially cylindrical, but has a diameter that is smaller than Da. At a first end of the shaft 102a, the shaft 102a is connected to the probe body 101a for co-rotation therewith, and in the vicinity of a second end of the shaft 102a, opposite the first end thereof, the shaft 102a is provided on an outer peripheral surface thereof with a toothing, which forms a sprocket ring or gear 103a. The probe body 101a and the shaft 102a are connected such as to be substantially coaxially arranged. The first probe device 100a comprises a central internal passage 104a which axially extends through the probe body 101a and the shaft 102a. At opposite ends of the probe device 100a, i.e. at an end face of the probe body 101a oriented away from the first end of the shaft 102a, and at the second end of the shaft 102a, the passage 104a is open towards the outside.

The second probe device 100b comprises a probe body 101b and a central shaft 102b. The shaft 102b extends from one end face of the probe body 101b. The probe body 101b has a substantially circular outer cross-section, may be substantially cylindrical, and has an outer diameter Db as well as an axial length tb. Further, the shaft 102b may be substantially cylindrical, but has a diameter that is considerably smaller than Db. At a first end of the shaft 102b, the shaft 102b is connected to the probe body 101b for co-rotation therewith, and in the vicinity of a second end of the shaft 102b, opposite the first end thereof, the shaft 102b is provided on an outer peripheral surface thereof with a toothing, which forms a sprocket ring or gear 103b. The probe body 101b and the shaft 102b are connected such as to be substantially coaxially arranged. The second probe device 100b comprises a central internal passage 104b which axially extends through the probe body 101b and the shaft 102b. At opposite ends of the probe device 100b, i.e. at an end face of the probe body 101b oriented away from the first end of the shaft 102b, and at the second end of the shaft 102b, the passage 104b is open towards the outside.

The third probe device 100c comprises a probe body 101c and a central shaft 102c. The shaft 102c extends from one end face of the probe body 101c. The probe body 101c has a substantially circular outer cross-section, may be substantially cylindrical, and has an outer diameter Dc as well as an axial length tc. Further, the shaft 102c preferably is substantially cylindrical, but has a diameter that is considerably smaller than Dc. At a first end of the shaft 102c, the shaft 102c is connected to the probe body 101c for co-rotation therewith, and in the vicinity of a second end of the shaft 102c, opposite the first end thereof, the shaft 102c is provided on an outer peripheral surface thereof with a toothing, which forms a sprocket ring or gear 103c. The probe body 101c and the shaft 102c are connected such as to be substantially coaxially arranged. The shaft 102c may be solid.

Figure 4:
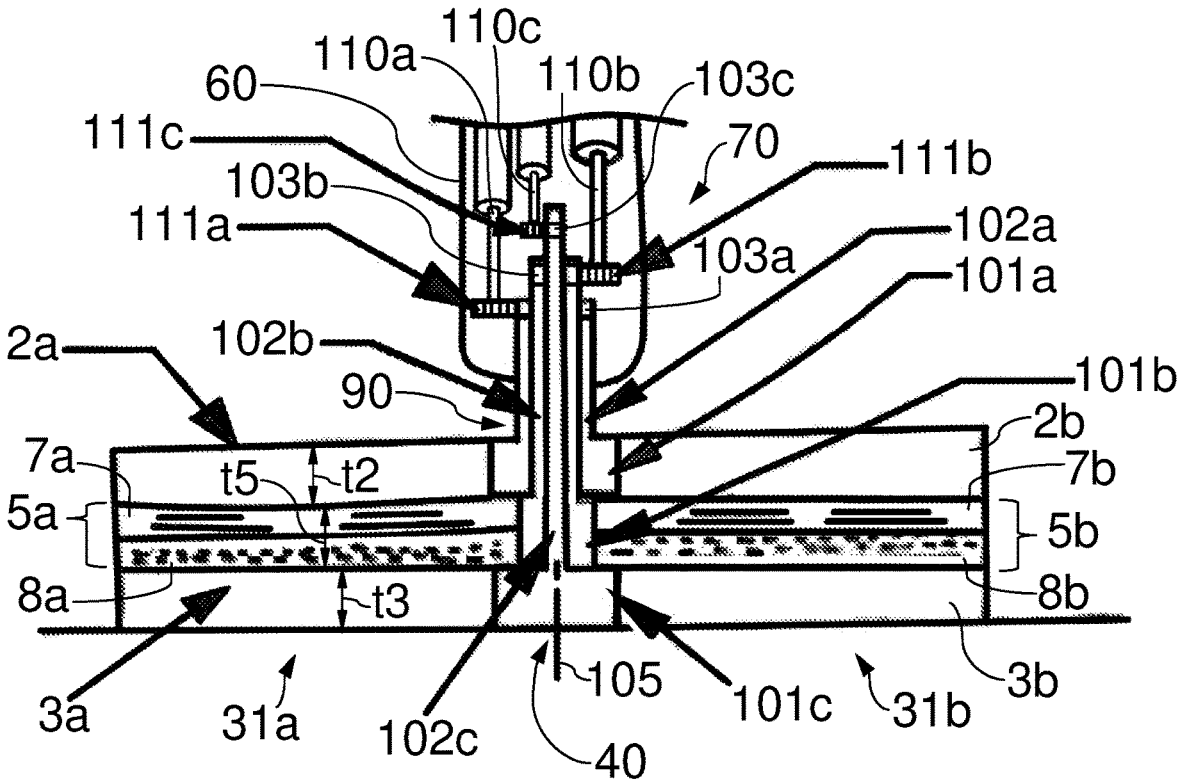
FIG. 4 shows a welding device in accordance with the embodiment of FIG. 3 during friction stir welding of two pieces of a fiber metal laminate, in a schematic cross-sectional view.

The length ta is adapted depending on a thickness t2 of the metal layer 2, the length tb is adapted depending on a thickness t5 of the synthetic layer 5, and the length tc is adapted depending on a thickness t3 of the metal layer 3, see also FIG. 4. In particular, the lengths ta, tb, tc are selected such that approximately ta=t2, tb=15 and tc=t3.

The diameters Da, Db and Dc are individually chosen depending on the properties of the layers 2, 5 and 3, respectively, to be welded. Ideal values of Da, Db and Dc for given thicknesses and materials may be found by experiment. In the exemplary embodiment of FIGS. 3 and 4, the metal layers 2 and 3 are formed from the same aluminum alloy, and t2=t5=t3. In FIGS. 3 and 4, the diameters Da, Db and Dc as well as lengths ta, tb and tc are selected such that approximately Da=Dc and Da>Db and ta=tb=tc. In some variants, each of t2, t5 and t3 may be less than or equal to 1.0 mm. Other layer thicknesses t2, t5, t3 are conceivable.

FIG. 3 also illustrates that in order to assemble the probe assembly 90, the shaft 102b is inserted into the passage 104a and is rotatable within the passage 104a, and the shaft 102c is inserted into the passage 104b and is rotatable within the passage 104b. In an assembled state of the probe assembly 90, the probe bodies 101a, 101b and 101c abut against each other in this order, and the probe devices 100a, 100b and 100c are coaxially arranged and rotatable with respect to each other about a common axis of rotation 105, as shown in FIG. 4.

Axial lengths of the shafts 102a, 102b, 102c are chosen such that in the assembled state of the probe assembly 90, the shaft 102b outwardly protrudes from the second end of the shaft 102a, and that the shaft 102c outwardly protrudes from the second end of the shaft 102b, in such a manner that the each of the sprockets or gears 103a, 103b and 103c is accessible.

FIG. 4 shows the assembled probe assembly 90 during friction stir welding of the two parts 31a and 31b. In FIG. 4, for the parts 31a, 31b, the layers 2, 3 and 5 as well as the sublayers 7 and 8 are labelled 2a, 3a, 5a and 7a, 8a, as well as 2b, 3b, 5b and 7b, 8b, respectively. The layer thicknesses t2, t5 and t3 are indicated for the layers 2a, 5a and 3a of part 31a only, but are the same for the layers 2b, 5b and 3b of part 31b.

The drive arrangement 60 comprises several drive shafts 110a, 110b and 110c. The drive shafts 110a, 110b and 110c can each be rotatably driven. The drive shaft 110a comprises a sprocket ring or gear 111a configured to mesh with the sprocket ring or gear 103a for rotationally driving the shaft 102a and the probe body 101a. The drive shaft 110b comprises a sprocket ring or gear 111b configured to mesh with the sprocket ring or gear 103b for rotationally driving the shaft 102b and the probe body 101b. The drive shaft 110c comprises a sprocket ring or gear 111c configured to mesh with the sprocket ring or gear 103c for rotationally driving the shaft 102c and the probe body 101c. The meshing toothings provided by the sprocket rings or gears 103a and 111a, 103b and 111b, 103c and 111c, respectively, may in some embodiments be configured to provide a suitable transmission ratio, e.g. for changing the angular velocity of the shaft 102a, 102b or 102c in comparison with that of the assigned drive shaft 110a, 110b or 110c, respectively.

By the drive arrangement 60, the probe devices 100a, 100b and 100c are each simultaneously driven for rotation thereof about the common axis of rotation 105. A rotational velocity of each drive shaft 110a, 110b and 110c is preferably individually controllable and adjustable. For example, the rotational velocities of the drive shafts 110a-c may each be steplessly controllable. At least, however, the rotational velocity of the drive shaft 110b can be selected or is set in such a manner that a rotational velocity of the probe body 101b is different from rotational velocities of the probe bodies 101a and 101c, which for example may be substantially equal.

FIG. 4 also shows that during friction stir welding, each of the probe bodies 101a-c is in contact with corresponding ones of the layers 2a and 2b, 5a and 5b or 3a and 3b, respectively. In particular, each pair of corresponding layers is made from the same material. The probe devices 100a, 100b and 100c simultaneously act on the layers 2a-b, 5a-b and 3a-b, respectively. During the friction stir welding process using the welding device 70, the layers 2a and 2b are individually welded to each other, the layers 5a and 5b are individually welded to each other, and the layers 3a and 3b are individually welded to each other.

For example, for the same thickness t2=t3=15 of metal layers 2, 3 and synthetic layer 5 with thermoplastic matrix 13, due to the lower thermal conductivity of the thermoplastic, a but joint weld line within the thermoplastic layers 5a,b is preferably narrower than within the metal layers 2a,b and 3a,b, in order for the heat to penetrate this width, and hence Db<Da and Db<Dc. Moreover, an increased amount of heat may be needed in the thermoplastic layers 5a,b, and in order to generate a sufficient amount of friction in the thermoplastic layers 5a,b at the joint, the rotational velocity, i.e. angular velocity, of the probe body 101b used to weld the thermoplastic layers 5a-b is preferably higher than the rotational velocity, i.e. angular velocity, of the probe bodies 101a and 101c. Larger diameters Da, Dc and lower rotational velocities are preferable for the probe bodies 101a,c used for welding the metal layers 2a-b, 3a-b. Each probe device 100a-c is thus rotated at an individually chosen rotational velocity.

The outer diameters Da, Db, Dc and the rotational velocities of the probe bodies 101a, 101b and 101a are adapted to the requirements of the material of each layer 2, 5, 3, so that the layers 2a-b, 5a-b and 3a-b, respectively, can each be joined using optimal welding parameters adapted to the particular material, in particular to the metal material and the thermoplastic matrix 13.

The probe assembly 90 is moved as a unit along the butt joint weld line 40, defined by adjacent edges of the parts 31a, 31b, whereby a butt weld seam 45 is formed. This is shown in the perspective illustration in FIG. 5, in which the parts 31a, 31b have, in order to illustrate a further variant, each been turned by 90 degrees compared with FIG. 4, so that the fiber orientations in sublayers 7a-b, 8a-b are different from those in FIG. 4. Regarding the optional shoulder 95 shown in FIG. 2 but not present in the situation of FIG. 5, in case the shoulder 95 is optionally provided, it essentially abuts on the top faces of the adjacent parts 31a, 31b, has a diameter larger than the probe body 101a, and may be rotationally fixed or may rotate about the axis 105 during friction stir welding. Alternatively, the shoulder 95 may not be necessary and may be omitted. Such a shoulder 95, which may rotate at a lower rotational velocity than the probe device(s), e.g. 100a, or may be rotationally fixed, may be useful to maintain the contour on the top face of the material if the topmost layer is made with a thermoplastic matrix. If, as in the embodiments described with reference to FIGS. 1-5, the topmost layer is a metal layer 2, the shoulder 95 is not necessary, but a co-rotating shoulder 95 may in some variants be helpful in the case of a thicker metal layer 2.

In other embodiments, the probe assembly 90 may comprise two probe devices for welding sections or parts of a two-layer laminate, not shown in the Figures, or the probe assembly may comprise more than three probe devices, e.g. five probe devices for welding sections or parts of the laminate 1' of FIG. 1 (*c*). In other words, each individual layer in a great variety of fiber metal laminates can be processed in appropriate manner. Symmetry of the layer arrangement of the laminate with respect to a center main plane of extension thereof, which would be horizontal e.g. in FIG. 4, is not required. Layers, e.g. metal or synthetic layers, having different thicknesses within one laminate can be processed.

In a variant, it may be conceivable to provide a probe set, as schematically illustrated in FIG. 3, with a number of different probe devices, e.g. more than three, that can be assembled and re-assembled in various configurations of the probe assembly 90, which can then be coupled to the drive arrangement 60 for being used for friction stir welding. This may enable increased flexibility e.g. for adjusting the probe body diameters.

The method of friction stir welding and the friction stir welding device of the invention, of which embodiments are described above, in particular make it possible to obtain one or more of the following advantages:

Individual attention can be paid to the temperature requirements and heat conductivity for each material for the friction stir welding, which is made possible by enabling probes to rotate at different rotational velocities.

Individual attention can be paid to the ideal weld line width for each layer, by enabling the probes to be provided with individual probe diameters.

Efficient and fast welding of fiber metal laminates is made possible, the efficiency and speed being comparable to friction stir welding of monolithic parts from a single material.

Analogous advantages can be obtained for a workpiece having a butt weld seam created in line with the invention.

Figures 5, 6, 7:
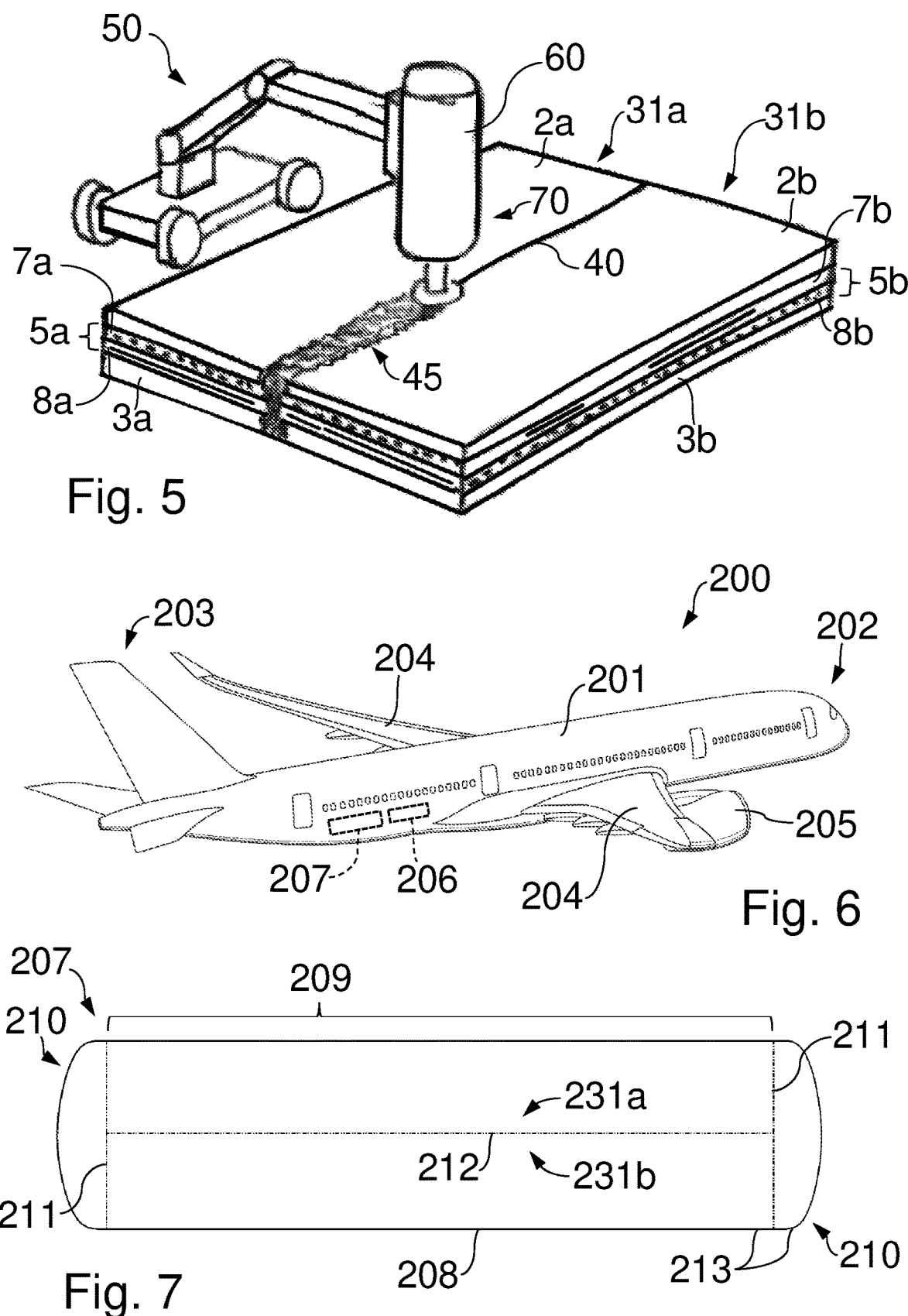
FIG. 5 shows the welding device in accordance with the embodiment of FIGS. 3 and 4 in operation during friction stir welding of two parts of a fiber metal laminate in schematic perspective view.
FIG. 6 shows, in perspective view, an exemplary aircraft in which a workpiece or component in accordance with embodiments of the invention may be used; an FIG. 7 shows a schematic plan view of a storage tank for cryogenic hydrogen according to an embodiment of the invention, which may in particular be adapted for use in the exemplary aircraft of FIG. 6.

FIG. 6 shows an exemplary aircraft 200 having a fuselage 201, a nose 202, an empennage 203, wings 204 and engines 205. In exemplary manner, the aircraft 200 is configured as a passenger aeroplane. The aircraft 200 is provided with a hydrogen-based propulsion system. In particular, the engines 205 may be configured as gas turbines adapted for combustion of hydrogen with oxygen for the purpose of propulsion. Further, the aircraft 200 may be provided with one or more fuel cells 206, only schematically indicated in FIG. 1, adapted to generate electrical power using hydrogen as well as oxygen. Electrical power obtained in this way may alternatively be used for propulsion. Further, the aircraft 200 may comprise a hybrid hydrogen-based arrangement for propulsion and energy supply, including both combustion of hydrogen in the jet engines 205 as well as fuel cells 206 for generation of electricity to supply various devices in the aircraft 200. Such aircraft 200 may be considered zero emission aircraft, avoid the emission of carbon dioxide during flight, and can significantly contribute to sustainable, environment-friendly air travel, by virtue of hydrogen-combustion and/or hydrogen-electric propulsion.

While the oxygen can be obtained from the ambient air, liquid hydrogen is stored within the aircraft 200 in one or more storage tanks 207. Preferably, the hydrogen is cooled down to a temperature of −253° C. and stored in liquid form, so as to minimize the volume required to store a quantity of hydrogen with a given energy content. A storage tank 207 for liquified, cryogenic hydrogen in accordance with an embodiment of the invention is schematically shown in FIG. 7. The hydrogen-based propulsion system of the aircraft 200 is supplied with hydrogen from the storage tank 207.

The liquid hydrogen storage tank 207 of FIG. 7 has a generally elongate shape and comprises a pressure vessel 208 as well as further installations, not shown in detail, which may be provided for filling the storage tank 207 and for supplying the hydrogen from the storage tank 207 e.g. to the engines 205 or fuel cells 206. Preferably, thermal insulation may be provided as well.

The vessel 208 is elongate and comprises a substantially cylindrical center section 209 as well as two dome-shaped end sections 210. The center section 209 and the dome-shaped end sections 210 are joined at peripheral butt weld seams 211 which follow an approximately circular path. Moreover, the center section 209 comprises a longitudinal butt weld seam 212 which serves, in the example displayed, for joining ends of a sheet of material that has been bent to form a cylinder. Alternatively, for instance, the center section 209 may be formed from shell-type sections, and in this case, the center section 209 may comprise two or more longitudinal butt weld seams 212.

Within the vessel 208, the liquid, cryogenic hydrogen will be stored. The vessel 208 is adapted to be pressurized, e.g. due to evaporation of liquid hydrogen, which then fills a space inside the vessel 208 above the liquid level. For example, the vessel 208 may be configured to safely sustain an internal pressure of at least approximately 3 bar, but the vessel 208 may in variants be designed for internal pressures higher or lower than 3 bar.

A vessel wall 213 of the vessel 208 is formed, in both the center section 209 and the end sections 210, from the fiber metal laminate 1 or 1', described above with reference to FIG. 1, or from a variant of such a laminate as described above.

The butt weld seams 211 and 212 are formed in an optimized and efficient manner in the way described above with reference to FIGS. 1-5, using the friction stir welding device 70 of the embodiments explained above. In this way, a pressurizable vessel 208 having seams 211, 212 of high quality can be made in a reasonable, expedient, quick and efficient manner from a fiber metal laminate, and is advantageous with regard to its reduced weight and improved fatigue behavior compared to a vessel made from solid metal sheets. When the butt weld seams 211 and 212 are formed, sections of the laminate forming the vessel wall 213 of the vessel 208 are joined as parts 231*a*, 231*b* of a workpiece, in a manner analogous to joining the parts 31*a*, 31*b* in FIGS. 2-5. In FIG. 7, this is indicated in exemplary manner for the longitudinal butt weld seam 212.

Producing the vessel 208 as a workpiece from a fiber metal laminate using the friction stir welding process and device 70 in accordance with the invention, of which embodiments are described herein above, thus provides the following further advantages:

Particularly efficient welding of longitudinal weld seams for forming cylindrical tubes, and of peripheral seams for joining end domes to such tubes, is made possible, for instance for producing liquid hydrogen storage tanks.

Using quick and efficient friction stir welding, a cryogenic tank material can be provided which is lighter and has a better fatigue behavior than monolithic aluminum alloys, and also has better characteristics than a pure composite laminate with respect to permeation and static electricity.

Although the invention has been completely described above with reference to preferred embodiments, the invention is not limited to these embodiments but may be modified in many ways.

In particular, the friction stir welding method and device of the invention may be used to form many other kinds of workpieces, for non-structural or structural applications, beyond the field of storage tanks for liquified gas.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1, 1' fiber metal laminate
2, 3, 4 metal layer
5, 6 synthetic layer
7, 8, 9, 10 synthetic sublayer
13 matrix
14 reinforcing fibers
31a, 31b part
32a, 32b edge
40 butt joint weld line
45 butt weld seam
50 robotic device
60 drive arrangement
70 friction stir welding device
90 probe assembly
95 shoulder
100a first probe device
100b second probe device
100c third probe device
101a,b,c probe body
102a,b,c shaft
103a,b,c sprocket ring or gear
104a,b passage
105 axis of rotation
110a,b,c drive shaft with sprocket ring or gear
111a,b,c sprocket ring or gear
200 aircraft
201 fuselage
202 nose
203 empennage
204 wing
205 engine
206 fuel cell
207 storage tank
208 vessel
209 center section
210 dome-shaped end section
211 peripheral butt weld seam
212 longitudinal butt weld seam
213 vessel wall
231a, 231b part
Da first outer diameter (probe body of first probe device)
Db second outer diameter (probe body of second probe device)
Dc third outer diameter (probe body of third probe device)
ta, tb, tc axial length (probe body)
t2, t3 layer thickness (metal layer)
t5 layer thickness (synthetic layer)

The invention claimed is:

1. A method for friction stir welding along a butt joint weld line, the method comprising:

providing a welding device comprising a probe assembly including a first probe body supported by a first shaft and a second probe body supported by a second shaft, wherein one of the first shaft and the second shaft is a hollow shaft and the other of the first shaft and the second shaft extends through the hollow shaft;

providing a first part and a second part to be joined along a butt joint weld line, wherein the first part and the second part are each a laminate comprising a first layer formed with a first material and a second layer formed with a second material, and the first material has different material properties than the second material;

arranging the first part and the second part such that a first edge of the first part is adjacent a second edge of the second part;

positioning both the first probe body and the second probe body to face a first edge of the butt joint weld line and face a first side of each of the first part and the second part;

advancing the first probe body and the second probe body in a common direction towards the first edge of the butt joint weld line and towards the first side of each of the first part and the second part;

positioning, by the advancement in the common direction, the first probe body between the first edge and the second edge, into alignment with the first layer of the first part and the first layer of the second part, at a first depth between the first edge and the second edge, and beyond an outer surface of at least one of the first part and the second part, wherein the outer surface faces the welding device;

positioning, by the advancement in the common direction, the second probe body between the first edge and the second edge, into alignment with the second layer of the first part and the second layer of the first part, and at a second depth different than the first depth; and performing friction stir welding to join the first part and the second part using the welding device, including rotating the first probe body and the second probe body and moving the welding device along the adjacent edges of the first part and the second part such that simultaneously the first probe body acts on the first layers and the second probe body acts on the second layers.

2. The method according to claim 1, wherein first material of the first layer has a thermal conductivity different than the second material and/or the first layer is a metal layer and the second layer is a synthetic layer comprising a thermoplastic material.

3. The method according to claim 1, wherein the first part and the second part are each made from a fiber-metal laminate, wherein the first layer is a metal layer and the second layer is a synthetic layer formed with a thermoplastic matrix and reinforcing fibers embedded in the thermoplastic matrix.

4. The method according to claim 1, wherein each of the first probe and the second probe comprises a respective probe body configured to contact a respective one of first layer and the second layer during the friction stir welding, wherein an outer diameter of the probe body of the first probe differs from the outer diameter of the probe body of the second probe, and the method further comprises rotating the probe bodies of the first probe and the second probe body at a different rotational speeds during the friction stir welding.

5. A method to form a workpiece component of an aircraft or spacecraft comprising:

providing a first part and a second part each formed of a fiber metal laminate including a metal layer and a synthetic layer with embedded rein-forcing fibers, wherein each of the first part and the second part have a respective outer surface;

aligning a first edge of the first part next to a second edge of the second part to form a butt joint to be welded, wherein the metal layers of the first part and the second part are aligned in a first plane and the synthetic layers of the first part and the second part are aligned in a second plane parallel to the first plane;

positioning both a first probe body supported by a first shaft and a second probe body supported by the second shaft to face a first edge of the butt joint and to face a first side of each of the first part and the second part, wherein one of the first shaft and the second shaft is a hollow shaft and the other of the first shaft and the second shaft extends through the hollow shaft;

advancing the first probe body and the second probe body in a common direction towards the first edge of the butt joint and towards the first side of each of the first part and the second part;

inserting a first probe body between and in alignment with the metal layers at the first plane, wherein the first probe body is inserted a first depth beyond the outer surface of at least one of the first part and the second part, wherein the first probe body advances along a common direction and towards a first edge of the butt joint;

inserting along the common direction and towards the first edge of the butt joint, a second probe body between and in alignment with the synthetic layers at the second plane, wherein the second probe body is inserted a second depth beyond the outer surface, the second depth is different than the first depth, and friction stir welding the first edge to the second edge by actuating the first probe body to friction stir weld the metal layers and simultaneously actuating the second probe body to friction stir weld the synthetic layers, diameter of the first probe body differs from an outer diameter of the second probe body.

6. A method to form a workpiece component of an aircraft or spacecraft comprising:

providing a first part and a second part each formed of a fiber metal laminate including a metal layer and a synthetic layer with embedded rein-forcing fibers, wherein each of the first part and the second part have a respective outer surface;

aligning a first edge of the first part next to a second edge of the second part, wherein the metal layers of the first part and the second part are aligned in a first plane and the synthetic layers of the first part and the second part are aligned in a second plane parallel to the first plane;

inserting a first probe body between and in alignment with the metal layers at the first plane, wherein the first probe body is inserted a first depth beyond the outer surface of at least one of the first part and the second part;

inserting a second probe body between and in alignment with the synthetic layers at the second plane, wherein the second probe body is inserted a second depth beyond the outer surface, wherein the second depth is different than the first depth, and friction stir welding the first edge to the second edge by actuating the first probe body to friction stir weld the metal layers and simultaneously actuating the second probe body to friction stir weld the synthetic layers;

wherein a first shaft supports the first probe body and a second shaft supports the second probe body, and one of the first shaft and the second shaft is a hollow shaft and the other of the first shaft and the second shaft extends through the hollow shaft, and wherein the friction stir welding includes rotating the first shaft and the first probe body at a different rotational rate than the second shaft and the second probe body during the friction stir welding.

7. The method of claim 5, further comprising:

rotating first probe body during the friction stir welding, and rotating the second probe body during the friction stir welding and at a rotational speed different than a rotational speed of the first probe body.

8. The method of claim 5, further comprising moving the first probe body and the second probe body along the first edge and the second edge during the friction stir welding.

9. The method of claim 5, wherein an outer diameter of the first probe body differs from an outer diameter of the second probe body.

10. The method according to claim 1, wherein the friction stir welding includes rotating the first shaft and the first probe body at a different rotational rate than the second shaft and the second probe body during the friction stir welding.

* * * * *